INVENTOR.
FLORENTIN J. PEARNE

Oct. 26, 1965   F. J. PEARNE   3,213,886
FLOW CONTROL VALVE WITH STOP MEANS MOVABLE
AT A CONTROLLED RATE
Filed Oct. 22, 1962   3 Sheets-Sheet 3

INVENTOR.
FLORENTIN J. PEARNE
BY Ely, Pearne & Gordon
ATTORNEYS

United States Patent Office 3,213,886
Patented Oct. 26, 1965

3,213,886
FLOW CONTROL VALVE WITH STOP MEANS MOVABLE AT A CONTROLLED RATE
Florentin J. Pearne, Alhambra, Calif., assignor to Pearne and Lacy Machine Company, Inc., Los Angeles, Calif., a corporation of California
Filed Oct. 22, 1962, Ser. No. 234,259
12 Claims. (Cl. 137—625.69)

This invention relates to a flow control device and more particularly to a control device for automatically regulating the rate of fluid flow in hydraulic systems that require acceleration or deceleration between high and low speed values.

In many industrial applications, two and four-way valves are employed to control fluid flow in constant delivery hydraulic circuits. This fluid flow, in turn, may control the rotational direction of a fluid motor and/or the direction of movement of a work cylinder. The controlled fluid motor and/or work cylinder may, in turn, be employed as feed mechanisms for metal cutting, metal forming, welding, conveying mechanisms, and other machines where loads must be handled gently and rapidly. The rate of feed, as contrasted with the feed direction, is determined by the volume of hydraulic fluid per unit time that is admitted to the work cylinder and/or fluid motor.

To control the directional characteristics and the rate of feed of the work cylinder and/or fluid motor employed as feed devices, variable delivery pumps have been employed in circuits having valves that control the flow direction. This scheme has never been satisfactory where both accurate timing and accurate flow rate changes are required.

Attempts have also been made to control changes in flow rate through pilot operated two and four-way valves by employing a constant delivery pump and a pilot choke assembly. The pilot choke assembly controls the main valve spool speed when the spool is shifted by the pilot valve, and this action results in a predetermined control over the change of flow rate through the main valve. This choke assembly, however, results in a slow acting valve, since the speed at which the valve reverses the flow direction in the hydraulic circuit is dependent upon a relatively slow speed at which the valve spool can be operated. Thus, the pilot choke assembly may be adjusted to provide a predetermined deceleration of fluid flow through the circuit when it is desired to stop and change the directional characteristics of the work cylinder and/or the fluid motor employed in the circuit. The limited rate of spool travel that is required to produce a predetermined deceleration, however, also influences and is directly proportional to the speed at which the main valve can reverse the fluid flow.

It is an object of this invention to provide a valve system which will control the positive or negative acceleration of fluid flow in a hydraulic circuit in a predetermined manner and between predetermined limits while employing a constant delivery fluid pump and also achieving the desired ability of the valve to change the direction of fluid flow in the system virtually instantaneously.

It is a further object of the present invention to provide a device which will enable automatic or manual operation to alternately decelerate or accelerate the flow of fluid between predetermined limits in a hydraulic circuit without changing the direction of flow in the circuit.

It is a still further object of this invention to provide a device which will accomplish the above objectives with a minimum of expense and which may be installed in existing hydraulic circuits and valves.

A characteristic feature by which the foregoing objectives are achieved involves the use of a valve having a body portion which defines a fluid passage therein; flow control means which is reciprocable in the valve body along a predetermined path of travel; movable stop means controlling movement of the flow control means between spaced positions on the predetermined path of travel; and means for effecting movement of the stop means at a constant and predetermined velocity in at least one direction between the spaced positions. The particular means utilized for effecting the movement of the stop means may comprise a device for yieldably permitting such movement and/or a device for positively causing such movement. The former device, in general, may comprise a fluid pressure chamber having means for releasing fluid out of the chamber at a constant and predetermined rate. The latter device, in general, may comprise a fluid pressure chamber having means for admitting fluid into said chamber at a constant and predetermined rate.

The foregoing and numerous additional objects, features, and advantages of the invention will become apparent and more fully understood from the following detailed description of the invention and from the accompanying drawings in which.

Figure 1:
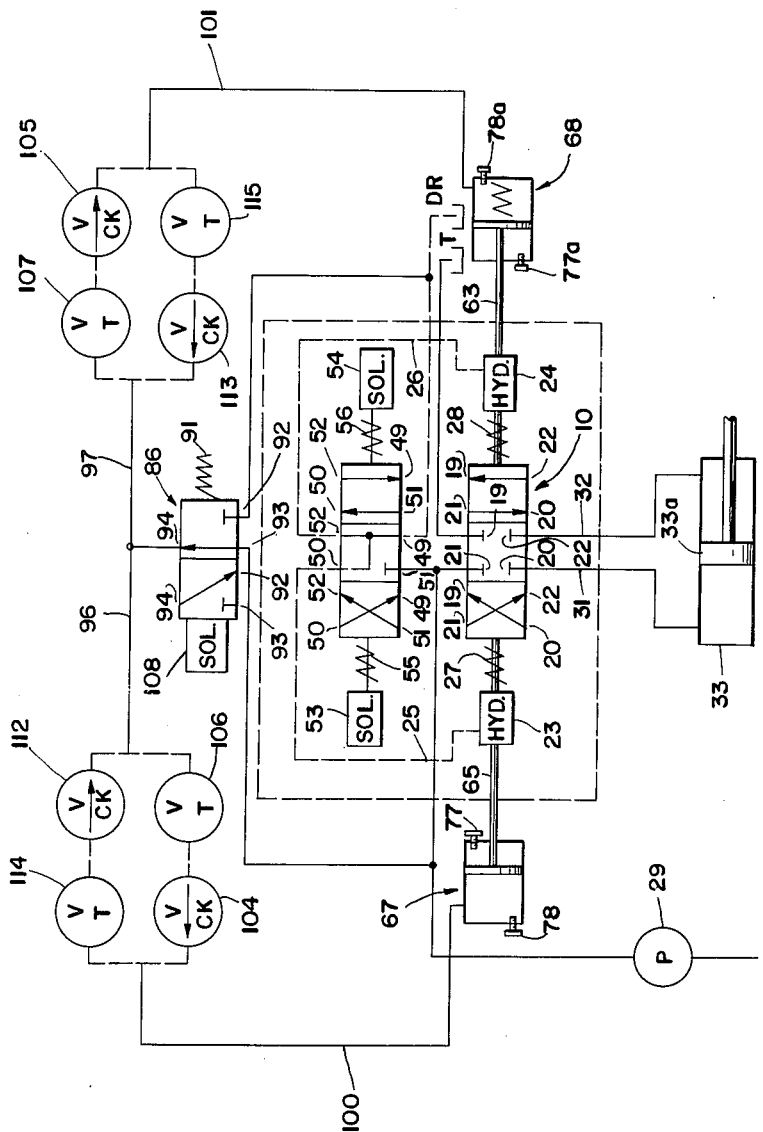
FIGURE 1 is an abstract and schematic view of a flow control device according to this invention.
Figure 2:
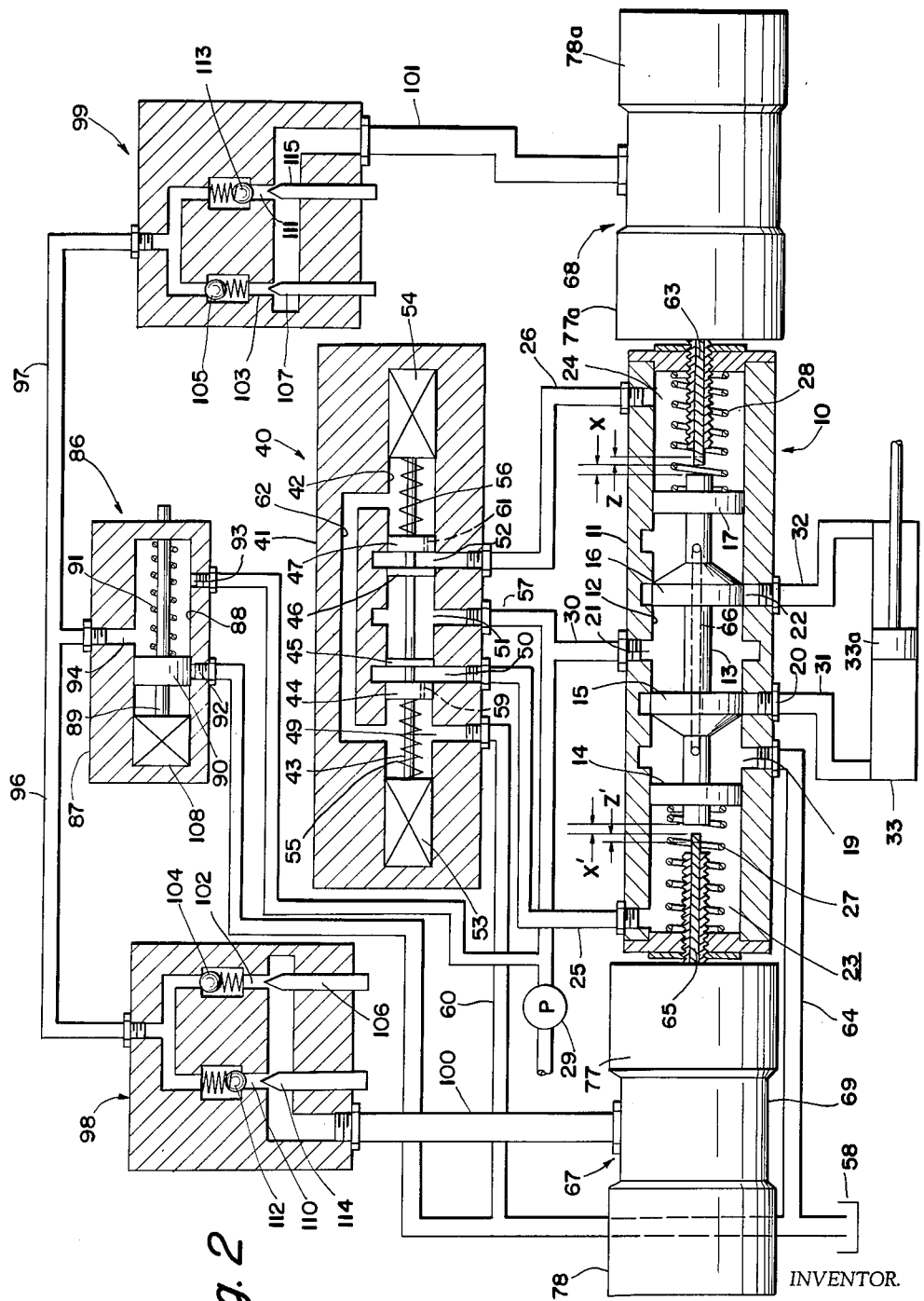
FIGURE 2 is a view of the flow control device of FIGURE 1 in greater detail showing some of the components in section.

Referring to FIGURES 1 and 2, a pilot operated, closed center, spring centered, four-way valve 10 is illustrated. As may be seen in greater detail in FIGURE 2, the valve 10 includes a valve housing 11 which is provided with a cylindrical bore 12. Enclosed within the cylindrical bore 12 in the valve housing 11 is a valve spool 13 having various valve means which comprise a first spool lobe 14, a second spool lobe 15, a third spool lobe 16, and a fourth spool lobe 17. The valve 10 also includes a first valve port means 19, a second valve port means 20, a third valve port means 21, and a fourth valve port means 22.

In FIGURES 1 and 2, the valve spool 13 is shown as being in a centered position and may be shifted to the right or to the left by the alternate application of fluid pressure to end pressure chambers 23 and 24, respectively. Fluid pressure is admitted alternately to chambers 23 and 24 through lines 25 and 26 in a manner which will hereinafter become apparent.

The normally centered position of the spool 13 is maintained, in the absence of a pressure differential between the chambers 23 and 24, by coil springs 27 and 28 which are located, repectively, in the chambers 23 and 24. In this normally centered position, pressurized fluid from a constant delivery pump 29 is blocked in a line 30 by the spool lobes 15 and 16 which seal the ports 20 and 22. Since the ports 20 and 22 are sealed from the pump 29, pressurized fluid is not delivered to either of a pair of lines 31 and 32, and a piston 33a in a double acting cylinder 33 is shown to be at rest.

The piston 33a associated with the cylinder 33 may be employed as a feed mechanism for machines where loads must be handled gently and rapidly. It is to be understood, however, that the illustrated cylinder 33 is set forth merely for purposes of illustration and simplicity. The lines 31 and 32 may lead to a fluid motor or other equivalent mechanism or mechanisms.

The four-way valve 10 is operated by a master or pilot valve 40. The pilot valve 40 includes a valve housing 41 which is provided with a cylindrical bore 42. Enclosed within the cylindrical bore 42 in the valve housing 41 is a valve spool 43 having various valve means which comprise a first spool lobe 44, a second spool lobe 45, a third spool lobe 46, and a fourth spool lobe 47. The valve 40 also includes a first valve port means 49, a second valve port means 50, a third valve port means 51, and a fourth valve port means 52.

In FIGURES 1 and 2, the valve spool 43 is shown as being in a centered position and may be shifted to the right or left by the alternate operation of solenoids 53 and 54, respectively, which are located at either end of the spool. In the absence of actuation of either of the solenoids 53 and 54, the illustrated centered position of the spool 43 is maintained by coil springs 55 and 56. In this normally centered position, pressurized fluid from the constant delivery pump 29 is blocked in a line 57 by the spool lobes 45 and 46. The pressurized fluid is thereby prevented from communicating with either of the chambers 23 or 24 through the lines 25 and 26, which are respectively connected to the ports 50 and 52. In the illustrated condition of the pilot valve 40, the pressure chambers 23 and 24 of the valve 10 are ported through the pressure chambers 23 and 24 of the valve 10 are ported through the valve 40 to a tank of reservoir 58 to permit the springs 27 and 28 to perform their function of maintaining the spool 13 in the illustrated centered position.

Fluid in chamber 23 in the valve 10 is ported to the tank 58 through the line 25, port 50, a passageway 59 in the lobe 44, the port 49, and through a line 60 to the tank 58. Fluid in chamber 24 is ported to the tank 58 through the line 26, the port 52, a passageway 61 in the lobe 47, a passageway 62 in the valve housing 41, the port 49, and through the line 60 to the tank 58.

If it is desired to move the piston 33a to the left, as shown in FIGURES 1 and 2, by the admission of pressurized fluid into the right end of the cylinder 33 through the line 32 and the simultaneous exhaustion of fluid from the left end of the cylinder 33 through the line 31, the solenoid 54 in the pilot valve 40 is energized. Upon such actuation of the solenoid 54, the spool 43 will shift to the left overcoming the bias of the coil spring 55. The lobe 45 will be positioned to the left of the port 50, the port 51 will be in fluid communication with the port 50, and pressurized fluid will be admitted to the chamber 23. The fluid pressure in the chamber 23 will drive the spool 13 to the right against the bias of the coil spring 28, and the lobe 16 will open the port 22 to fluid communication with the port 21. Pressurized fluid will thereby be admitted through the line 32 to the right end of the cylinder 33 so as to drive the piston 33a to the left.

The particular distance that the spool 13 is permitted to move to the right is determined by a stop means 63, which is located at the right end of the valve housing 11. The operation of the stop means 63 will be described in greater detail. In the position shown in FIGURE 2, however, the stop means 63 is illustrated as being positioned a predetermined distance X from the right end of the spool 13 to permit the spool 13 to travel this distance. The lobe 16 will consequently travel this same distance X to partially uncover the port 22 in accordance with this predetermined value. The pressurized fluid will thereby be admitted to the line 32 at a relatively low predetermined rate, and the piston 33a will travel at a constant low or creep velocity.

As will become apparent, the stop means 63 is capable of being moved a distance Z to a position indicated by the phantom lines in FIGURE 2 upon the application of pressure by the right end of the spool 13 and under conditions which will be explained in greater detail. The stop means 63 travels the distance Z at a constant and predetermined velocity. The lobe 16 will consequently travel this same distance Z to further uncover the port 22 at a constant velocity. Since the fluid admitted through the port 22 is under constant pressure and the port 22 is progressively further uncovered at a constant and predetermined velocity, the increased flow of fluid through the line 32 will accelerate the movement of the piston 33a in proportion to the velocity of movement of the stop means 63 and for a time corresponding to the time required for the stop means 63 to move the distance Z.

As the lobe 16 establishes fluid communication between the ports 21 and 22, the lobe 15 will uncover the port 20 and permit the fluid in the left end of the cylinder 33 to be drained through the line 31, the port 20, the port 19, a line 64, and into the tank 58.

If it is desired to move the piston 33a to the right, as shown in FIGURES 1 and 2, by admission of pressurized fluid into the left end of the cylinder 33 through the line 31 and by the simultaneous exhaustion of fluid from the right end of the cylinder 33 through the line 32, the solenoid 53 in the pilot valve 40 is energized. Upon such actuation of the solenoid 53, the spool 43 will shift to the right overcoming the bias of the coil spring 56. The lobe 46 will thereby be positioned to the right of the port 52; the port 51 will be in fluid communication with the port 52; and pressurized fluid will be admitted to the chamber 24. The fluid pressure in the chamber 24 will drive the spool 13 to the left against the bias of the coil spring 27, and the lobe 15 will open the port 20 to fluid communication with the port 21. Pressurized fluid will thereby be admitted through the line 31 to the left end of the cylinder 33 to drive the piston 33a to the right.

The particular distance that the spool 13 is permitted to move to the left is determined by a stop means 65 located at the left end of the valve housing 11. The operation of the stop means 65 will be described in greater detail below. In the position shown in FIGURE 2, however, the stop means 65 is illustrated as being positioned a predetermined distance X' from the left end of the spool 13 to permit the spool 13 to travel this distance. The lobe 15 will consequently travel this same distance X' to partially uncover the port 20 in accordance with this predetermined value. The pressurized fluid will thereby be admitted to the line 31 at a relatively low predetermined rate, and the piston 33a will travel at a constant low or creep velocity.

As will become apparent, the stop means 65 is capable of being moved a distance Z' to a position indicated by the phantom lines in FIGURE 2 upon the application of pressure by the left end of the spool 13 and under conditions which will be explained in greater detail. The stop means 65 travels the distance Z' at a constant and predetermined velocity. The lobe 15 will consequently travel this same distance Z' to further uncover the port 20 at a constant velocity. Since the fluid admitted to the port 20 is under constant pressure and the port 20 is progressively further uncovered at a constant and predetermined velocity, the increased flow of fluid through the line 31 will accelerate the movement of the piston 33a in proportion to the velocity of movement of the stop means 65 and for a time corresponding to the time required for the stop means 65 to move the distance Z'.

As the lobe 15 establishes fluid communication between the ports 21 and 20, the lobe 16 will uncover the port 22 and permit the fluid in the right end of the cylinder 33 to be drained through the line 32, the port 22, a bore 66 in the spindle 13, the port 19, the line 64, and into the tank 58.

To achieve the aforementioned movements of the stop means 63 and 65, spool control cylinders 67 and 68 are provided at either end of the valve housing 11. One of these control cylinders (the control cylinder 67) is illustrated in detail in FIGURE 3, but it is to be understood that the cylinders 67 and 68 are identical as to construction.

Figure 3:
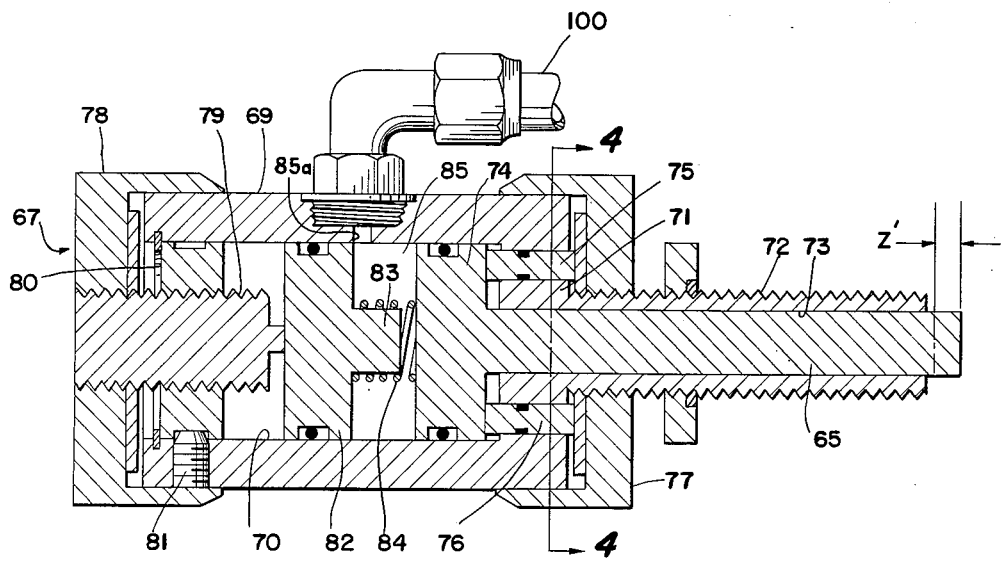
FIGURE 3 is an enlarged sectional view of a control cylinder employed in the flow control circuit illustrated in FIGURES 1 and 2.
Figure 4:
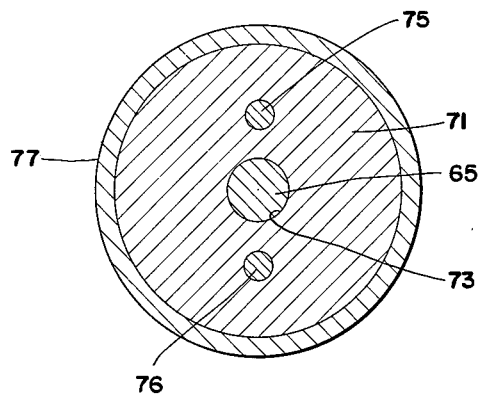
FIGURE 4 is a sectional view of the control cylinder of FIGURE 3, the plane of the section being indicated by the line 4—4 in FIGURE 3.

Referring now to FIGURES 3 and 4, the control cylinder 67 includes a cylindrical body portion 69 having an axial bore 70 therein. The body portion 69 is substantially closed at one end by an end wall 71. The end wall 71 is provided with an externally threaded cylindrical extension 72. An axial bore 73 extends through the extension 72 and the end wall 71. The stop means 65, referred to above with reference to FIGURES 1 and 2, is slidably mounted in the bore 73 and has a piston head portion 74 which is slidably mounted within the bore 70. Stroke limit pins 75 and 76 are slidably mounted in the end wall 71 and serve to limit and adjust the extent of the forward stroke of the stop means 65. The particular adjusted position of the pins 75 and 76 is determined by a first end cap 77 which is threaded onto the extension 72.

A second end cap 78 is provided at the other end of the body portion 69 and has affixed thereto an inwardly extending stroke limit pin 79 which is threaded through an end seal member 80. The member 80 is fixed with respect to the body portion 69 by a set screw 81, and the limit pin 79 is adjusted relative to the body portion 69 by turning the cap 78 to screw the pin 79 into or out of the end seal member 80. The particular position of the limit pin 79, in turn, determines the position of a piston 82 in the bore 70. The piston 82 serves to limit the extent of the rearward stroke of the stop means 65 when the piston head portion 74 butts against an extension 83 of the piston 82. The piston head portion 74 and the piston 82 are normally biased apart by a coil spring 84 and define a pressure chamber 85 therebetween.

The chamber 85 in the control piston 67 and the corresponding chamber (not shown) in the control piston 68 are normally in fluid communication with the pump 29 through a port 85a in the chamber 85 and through a port (not shown) in the corresponding chamber in the control piston 68. This fluid communication will be explained in greater detail below. As may be seen in FIGURES 1 and 2, a spring offset, solenoid operated, two-way valve 86 is illustrated. The valve 86 includes a valve housing 87 having a cylindrical bore 88. Slidably mounted within the bore 88 is a valve spool 89 having a lobe 90. The valve spool 89 and its lobe 90 are normally biased in the position shown in FIGURES 1 and 2 by a spring 91. In this position, the lobe 90 blocks a port 92 and permits fluid passage from a port 93 to a port 94. The port 93 receives pressurized fluid from the pump 29 through a line 95. The fluid flows from the port 93 through the port 94 to lines 96 and 97 and to fluid control blocks 98 and 99, respectively.

The blocks 98 and 99 are identical as to structure and function and permit the flow of fluid therethrough at rates which may be independently controlled in either direction.

The fluid flowing from lines 96 and 97 through the blocks 98 and 99 and to lines 100 and 101, respectively, must pass through orifices 102 and 103, respectively, via one-way check valves 104 and 105. The rate of fluid flow in this direction is controlled by needle valves 106 and 107, which are positioned, respectively, at the orifices 102 and 103.

Upon energizing a solenoid 108 in the valve 86, the lobe 90 will be shifted to the right to block the port 93 and establish fluid communication between the port 94, the port 92, and through a line 109 to the tank 58. The fluid flowing from lines 100 and 101 through the blocks 98 and 99 and to lines 96 and 97, respectively, must pass through orifices 110 and 111, respectively, and then through one-way check valves 112 and 113. The rate of fluid flow in this direction is controlled by needle valves 114 and 115 which are positioned, respectively, at the orifices 110 and 111.

With the valve 86 in its normally open position, fluid pressure will exist in the chamber 85, in the control cylinder 67, and in the corresponding chamber (not shown) in the control cylinder 68. The stop means 65 and 63 will be in the positions indicated by the solid lines in FIGURES 2 and 3, and, as was previously explained, these positions may be independently preselected by adjustment of the end cap 77 on the cylinder 67 and of a corresponding end cap 77a on the cylinder 68.

When the valve 10 is actuated in the previously described manner to permit fluid flow into the left end of the cylinder 33 through the line 31, the valve spool 13 will substantially instantaneously shift to the left until the left end of the spool 13 butts against the stop means 65. The port 20 will be opened a relatively small amount and the piston 33a will creep to the right at a constant and relatively low velocity. When it is desired to accelerate the movement of the piston 33a to a constant and relatively high velocity, the solenoid 108 is energized to permit fluid to flow from either the control cylinder 67 or 68 back to the tank 58, according to the direction of movement of the piston 33a as determined by the position of the spool 13. The force exerted by the spool 13 on the stop means 65 will express the fluid from the chamber 85 of the control cylinder 67 at a rate which is determined by the setting of the needle valve 114 in the block 98. Thus, the needle valve 114 controls the rate at which the port 20 in the valve 10 is opened by the lobe 15 and, therefore, the acceleration of the piston 33a to the right. The distance Z' that the stop means 65 is permitted to travel is dependent upon the position of the extension 83, and this, in turn, is determined by the adjustment of the end cap 78 on the control cylinder 67. When the stop means 65 has moved the distance Z', predetermined by the adjustment of the end cap 78, the acceleration of the piston 33a will cease and the piston 33a will continue its travel at a constant and relatively high velocity.

If it is desired to decelerate the speed of the piston 33a, either at a time when it is accelerating toward its peak speed or after it has reached its peak speed, the solenoid 108 in the two-way valve 86 is de-energized to permit fluid to flow from the pump 29 into the chamber 85 of the control cylinder 67. This rate of fluid flow and, consequently, the rate at which the lobe 15 will be pushed back to its creep speed position relative to the port 20 is determined by the adjustment of the needle valve 106 at the orifice 102 in the block 98.

When the valve 10 is actuated in the previously described manner to permit fluid flow into the right end of the cylinder 33 through the line 31, the valve spool 13 will substantially instantaneously shift to the right until the right end of the spool 13 butts against the stop means 63. The port 22 will thereby be opened a relatively small amount, and the piston 33a will creep to the left at a constant and relatively low velocity. When it is desired to accelerate the movement of the piston 33a to a constant and relatively high velocity, the solenoid 108 in the two-way valve 86 is energized to permit fluid to flow from either the control cylinder 67 or 68 back to the tank 58, according to the direction of movement of the piston 33a as determined by the position of the spool 13. The force of the spool 13 on the stop means 63 will express fluid from a pressure chamber in the control cylinder 68 (not shown, but corresponding to the pressure chamber 85 in the cylinder 67). The rate at which the fluid is expressed from this chamber is determined by the setting of the needle valve 115 in the block 99. Thus, the needle valve 115 controls the rate at which the port 22 is opened by the lobe 16 and, therefore, the acceleration of the piston 33a to the left. The distance Z that the stop means 63 is permitted to travel is dependent upon the position of an extension (not shown, but corresponding to the extension 83 in the control cylinder 67), and this, in turn, is determined by the adjustment of an end cap 78a on the control cylinder 68. When the stop means 63 has moved the distance Z, predetermined by the adjustment of the end cap 78a, the acceleration of the piston 33a will cease and the piston 33a will continue its travel at a constant and relatively high velocity.

If it is desired to decelerate the speed of the piston 33a, either during acceleration or after it has reached its peak speed, the solenoid 108 in the two-way valve 86 is de-energized to permit fluid to flow into the pressure chamber (not shown) in the control cylinder 68 from the pump 29. This rate of fluid flow and, consequently, the rate at which the lobe 16 will be pushed back to its creep speed position relative to the port 22 is determined by the adjustment of the needle valve 107 at the orifice 103 in the block 99.

The above description is directed to an operation procedure wherein the piston 33a is operated at a creep speed until the solenoid 108 is energized. It should be appreciated, however, that acceleration may begin immediately after the spool 13 has traveled the distances X or X' if the solenoid 108 is energized prior to energizing the solenoid 53 or the solenoid 54.

It should further be appreciated that, although the device illustrated in the drawings is not, and does not purport to be to scale, the relationship between certain dimensions is significant. For example, the skilled artisan should recongize that the face area presented by the spool lobes 14 and 17 to their respective pressure chambers 23 and 24 determines the total amount of pressure which is exerted on that end of the spool and by the other end of the spool. Likewise, the face area presented by the piston head portion 74 in the control cylinder 67, and the corresponding piston head portion (not shown) in the control cylinder 68, determines the total amount of pressure which is exerted on and by a particular stop means. Therefore, the face area of the lobes 14 and 17 must be less than the face area in the control cylinders 67 and 68 so that the total pressure exerted by the stop means 63 or 65 will be sufficient to overcome the pressure in the chambers 23 or 24 during a deceleration operation.

The invention is not restricted to the slavish imitation of each and every one of the details described above which have been set forth merely by way of example with the intent of most clearly setting forth the teaching of the invention. Obviously devices may be provided which change, elminate, or add certain specific details without departing from the invention.

What is claimed is:

1. A valve for controlling the rate and change of rate of fluid flow through a hydraulic circuit comprising a valve body, means defining a bore in said body, first port means in said valve body for connecting said bore to a source of pressurized fluid, second port means in said valve body for connecting said bore to a hydraulically controlled device in said hydraulic circuit, a valve spool having a lobe slidably mounted in said bore, means urging said lobe to a first position completely blocking said second port means, means for urging said lobe in a direction whereby said second port means is open and in fluid communication with said source of pressurized fluid, stop means limiting the movement of said lobe in said direction at a second predetermined position partially opening said second port means, whereby said hydraulically controlled device is moved at a relatively low and constant velocity, and means responsive to the movement of said lobe in said direction for moving said stop means at a constant and predetermined velocity within a range of velocities to a third predetermined position wherein said second port means is opened a greater amount whereby said hydraulically controlled device is accelerated during the movement of said lobe from said second predetermined position to said third predetermined position and whereby said hydraulically controlled device is moved at a relatively high and constant velocity when said lobe is at said third predetermined position, said means for moving said stop means including means to establish and maintain any desired velocity within said range.

2. A valve for controlling the rate and change of rate of fluid flow through a hydraulic circuit comprising a valve body, means defining a bore in said body, first port means in said valve body for connecting said bore to a source of pressurized fluid, second port means in said valve body for connecting said bore to a hydraulically controlled device in said hydraulic circuit, a valve spool having a lobe slidably mounted in said bore, means urging said lobe to a first position completely blocking said second port means, means for urging said lobe in a first direction whereby said second port means is open and in fluid communication with said source of pressurized fluid, stop means limiting the movement of said lobe in said first direction at a second predetermined position partially opening said second port means and for limiting the movement of said lobe in said first direction at a third predetermined position wherein said second port means is opened a greater amount, whereby said hydraulically controlled device is moved at a relatively low and constant velocity when said lobe is at said second predetermined position and said hydraulically controlled device is moved at a relatively high and constant velocity when said lobe is at said third predetermined position, and means for moving said stop means at a constant and predetermined velocity within a range of velocities from said third position to said second position to thereby move said lobe in a second direction opposite to said first direction, whereby said hydraulically controlled device is decelerated during the movement of said lobe from said third predetermined position to said second predetermined position, said means for moving said stop means including means to establish and maintain any desired velocity within said range.

3. A valve for controlling the rate and change of rate of fluid flow through a hydraulic circuit comprising a valve body, means defining a bore in said body, first port means in said valve body for connecting said bore to a source of pressurized fluid, second port means in said valve body for connecting said bore to a hydraulically controlled device in said hydraulic circuit, a valve spool having a lobe slidably mounted in said bore, means urging said lobe to a first position completely blocking said second port means, means for urging said lobe in a first direction whereby said second port means is open and in fluid communication with said source of pressurized fluid, stop means limiting the movement of said lobe in said first direction at a second predetermined position partially opening said second port means, whereby said hydraulically controlled device is moved at a relatively low and constant velocity, means responsive to the movement of said lobe in said first direction for moving said stop means at a constant and predetermined velocity within a range of velocities to a third predetermined position wherein said second port means is opened a greater amount, whereby said hydraulically controlled device is accelerated during the movement of said lobe from said second predetermined position to said third predetermined position and whereby said hydraulically controlled device is moved at a relatively high and constant velocity when said lobe is at said third predetermined position, said means for moving said stop means including means to establish and maintain any desired velocity within said range, and means for moving said stop means at a constant and predetermined velocity within a range of velocities from said third position to said second position to thereby move said lobe in a second direction opposite said first direction, whereby said hydraulically controlled device is decelerated during the movement of said lobe from said third predetermined position to said second predetermined position, said means for moving said stop means including means to establish and maintain any desired velocity within said range.

4. A valve for controlling the rate and change of rate of fluid flow through a hydraulic circuit comprising a valve body, means defining a bore in said body, first port means in said valve body for connecting said bore to a source of pressurized fluid, second port means in said valve body connecting said bore to a hydraulically controlled device in said hydraulic circuit to move said hydraulically controlled device in a first direction, third port means in said valve body connecting said bore to said hydraulically controlled device to move said hydraulically controlled device in a second direction, fourth port means in said valve body connecting said bore to a fluid reservoir, a valve spool having first and second lobes slidably mounted in said bore, means urging said lobes to a first position wherein said first lobe completely blocks said second port means and wherein said second lobe completely blocks said third port means, means for urging said lobes in a first direction whereby said second port means is open and in fluid communication with said source of pressurized fluid and said third port means is open and in fluid communication with said reservoir, first stop means limiting the movement of said lobes in their first direction at a second predetermined position partially opening said second and third port means, whereby said hydraulically controlled device is moved in its first direction at a relatively low and constant velocity, means responsive to the movement of said lobes in their first direction for moving said first stop means at a constant and predetermined velocity within a range of velocities to a third predetermined position wherein said second and third port means are opened a greater amount, whereby said hydraulically controlled device is accelerated in its first direction during the movement of said lobes from said second predetermined position to said third predetermined position and whereby said hydraulically controlled device is moved at a relatively high and constant velocity in its first direction when said lobes are at said third predetermined position, said means for moving said first stop means including means to establish and maintain any desired velocity within said range, means for urging said lobes in a second direction whereby said third port means is open and in fluid communication with said source of pressurized fluid and said second port means is open and in fluid communication with said reservoir, second stop means limiting the movement of said lobes in their second direction at a fourth predetermined position partially opening said second and third port means, whereby said hydraulically controlled device is moved in its second direction at a relatively low and constant velocity, means responsive to the movement of said lobes in their second direction for moving said second stop means at a constant and predetermined velocity within a range of velocities to a fifth predetermined position wherein said second and third port means are opened a greater amount, whereby said hydraulically controlled device is accelerated in its second direction during the movement of said lobes from said fourth predetermined position to said fifth predetermined position and whereby said hydraulically controlled device is moved at a relatively high and constant velocity in its second direction when said lobes are at said fifth predetermined position, said means for moving said second stop means including means to establish and maintain any desired velocity within said range.

5. A valve for controlling the rate and change of rate of fluid flow through a hydraulic circuit comprising a valve body, means defining a bore in said body, first port means in said valve body for connecting said bore to a source of pressurized fluid, second port means in said valve body connecting said bore to a hydraulically controlled device in said hydraulic circuit to move said hydraulically controlled device in a first direction, third port means in said valve body connecting said bore to said hydraulically controlled device to move said hydraulically controlled device in a second direction, fourth port means in said valve body connecting said bore to a fluid reservoir, a valve spool having first and second lobes slidably mounted in said bore, means urging said lobes to a first position wherein said first lobe completely blocks said second port means and wherein said second lobe completely blocks said third port means, means for urging said lobes in a first direction whereby said second port means is open and in fluid communication with said source of pressurized fluid and said third port means is open and in fluid communication with said reservoir, first stop means limiting the movement of said lobes in their first direction at a second predetermined position partially opening said second and third port means and limiting the movement of said lobes in their first direction at a third predetermined position wherein said second and third port means are opened a greater amount, whereby said hydraulically controlled device is moved in its first direction at a relatively low and constant velocity when said lobes are at said second predetermined position and said hydraulically controlled device is moved in its first direction at a relatively high and constant velocity when said lobes are at said third predetermined position, means for moving said first stop means at a constant and predetermined velocity within a range of velocities from said third position to said second position to thereby move said lobes in a second direction opposite to their first direction, whereby said hydraulically controlled device is decelerated during the movement of said lobes from said third predetermined position to said second predetermined position, said means for moving said first stop means including means to establish and maintain any desired velocity within said range, means for urging said lobes in their second direction wherein said third port means is open and in fluid communication with said source of pressurized fluid and said second port means is open and in fluid communication with said reservoir, second stop means limiting the movement of said lobes in their second direction at a fourth predetermined position partially opening said second and third port means and limiting the movement of said lobes in their second direction at a fifth predetermined position wherein said second and third port means are opened a greater amount, whereby said hydraulically controlled device is moved in its second direction at a relatively low and constant velocity when said lobes are at said fourth predetermined position and said hydraulically controlled device is moved in its second direction at a relatively high and constant velocity when said lobes are at said fifth predetermined position, means for moving said second stop means at a constant and predetermined velocity within a range of velocities from said fifth position to said fourth position to thereby move said lobes in their first direction, whereby said hydraulically controlled device is decelerated during the movement of said lobes from said fifth predetermined position to said fourth predetermined position, said means for moving said second stop means including means to establish and maintain any desired velocity within said range.

6. A valve for controlling the rate and change of rate of fluid flow through a hydraulic circuit comprising a valve body, means defining a bore in said body, first port means in said valve body for connecting said bore to a source of pressurized fluid, second port means in said valve body connecting said bore to a hydraulically controlled device in said hydraulic circuit to move said hydraulically controlled device in a first direction, third port means in said valve body connecting said bore to said hydraulically controlled device to move said hydraulically controlled device in a second direction, fourth port means in said valve body connecting said bore to a fluid reservoir, a valve spool having first and second lobes slidably mounted in said bore, means urging said lobes to a first position wherein said first lobe completely blocks said second port means and wherein said second lobe completely blocks said third port means, means for urging said lobes in a first direction whereby said second port means is open and in fluid communication with said source of pressurized fluid and said third port means is open and in fluid communication with said reservoir, first stop means limiting the movement of said lobes in their first direction at a second predetermined position partially opening said second and third port means, whereby said hydraulically controlled device is moved in its first direction at a relatively low and constant velocity when said lobes are at said second predetermined position, means responsive to the movement of said lobes in their first direction for moving said first stop means at a constant and predetermined velocity within a range of velocities to a third position wherein said second and third port means are opened a greater amount, whereby said hydraulically controlled device is accelerated during the movement of said lobes from said second predetermined position to said third predetermined position and whereby said hydraulically controlled device is moved at a relatively high and constant velocity when said lobes are at said third predetermined position, said means for moving said first stop means to said third position including means to establish and maintain any desired velocity within said range, means for moving said first stop means at a constant and predetermined velocity within a range of velocities from said third position to said second position to thereby move said lobes in their second direction, whereby said hydraulically controlled device is decelerated during the movement of said lobes from said third predetermined position to said second predetermined position, said means for moving said first stop means to said second position including means to establish and maintain any desired velocity within said range, means for urging said lobes in their second direction whereby said third port means is open and in fluid communication with said source of pressurized fluid and said second port means is open and in fluid communication with said reservoir, second stop means limiting the movement of said lobes in their second direction to a fourth predetermined position partially opening said second and third port means, whereby said hydraulically controlled device is moved in its second direction at a relatively low and constant velocity when said lobes are at said fourth predetermined position, means responsive to the movement of said lobes in their second direction for moving said second stop means at a constant and predetermined velocity within a range of velocities to a fifth position wherein said second and third port means are opened a greater amount, whereby said hydraulically controlled device is accelerated during the movement of said lobes from said fourth predetermined position to said fifth predetermined position and whereby said hydraulically controlled device is moved at a relatively high and constant velocity when said lobes are at said fifth predetermined position, said means for moving said second stop means to said fifth position including means to establish and maintain any desired velocity within said range, means for moving said second stop means at a constant and predetermined velocity within a range of velocities from said fifth position to said fourth position to thereby move said lobes in their first direction, whereby said hydraulically controlled device is decelerated during the movement of said lobes from said fifth predetermined position to said fourth predetermined position, said means for moving said second stop means to said fourth position including means to establish and maintain any desired velocity within said range.

7. In a valve, a body defining a fluid passage and containing flow control means reciprocable in the body along a predetermined path of travel between a first position fully opening said passage and a second position fully closing said passage, the improvement comprising movable stop means controlling movement of said flow control means between spaced positions on said path, at least one of said spaced positions lying between said first and second positions so that the movable stop means controls the movement of said flow control means only during a portion of the travel of said flow control means, means for effecting controlled movement of said stop means at a constant and predetermined velocity within a range of velocities in at least one direction between said spaced positions, said means for effecting movement of said stop means including means to establish and maintain any desired velocity within said range and further including means to vary the duration of said controlled movement.

8. In a valve, a body defining a fluid passage and containing flow control means reciprocable in the body along a predetermined path of travel between a first position fully opening said passage and a second position fully closing said passage, the improvement comprising means defining spaced positions on said path, movable stop means controlling movement of said flow control means between said means defining said spaced positions, at least one of said means defining said spaced positions being adjustable from a location lying between said first and second positions to a location at one of said first and second positions, means for effecting controlled movement of said stop means at a constant and predetermined velocity within a range of velocities in at least one direction between said spaced positions, said means for effecting movement of said stop means including means to establish and maintain any desired velocity within said range.

9. The improvement according to claim 8 wherein said means for effecting movement of said stop means includes means for yieldably opposing said movement.

10. The improvement according to claim 9 wherein said means for yieldably opposing said movement includes means defining a fluid pressure chamber and means for releasing fluid out of said chamber at a constant and predetermined rate.

11. The improvement according to claim 8 wherein said means for effecting movement of said stop means includes means for positively causing said movement.

12. The improvement according to claim 11 wherein said means for positively causing said movement includes means defining a fluid pressure chamber and means for admitting fluid into said chamber at a constant and predetermined rate.

References Cited by the Examiner
UNITED STATES PATENTS

| | | | |
|---|---|---|---|
| 840,876 | 1/07 | Steedman | 91—443 |
| 2,157,240 | 5/39 | Keel | 91—24 |
| 2,809,623 | 10/57 | Hall | 123—97 X |
| 2,981,287 | 4/61 | Caslow | 137—625.63 |
| 3,102,553 | 9/63 | Ottestad | 251—54 X |

M. CARY NELSON, *Primary Examiner.*

MARTIN P. SCHWADRON, *Examiner.*